J. J. O'MARA.
PERCOLATOR.
APPLICATION FILED FEB. 1, 1911.
997,845.
Patented July 11, 1911.
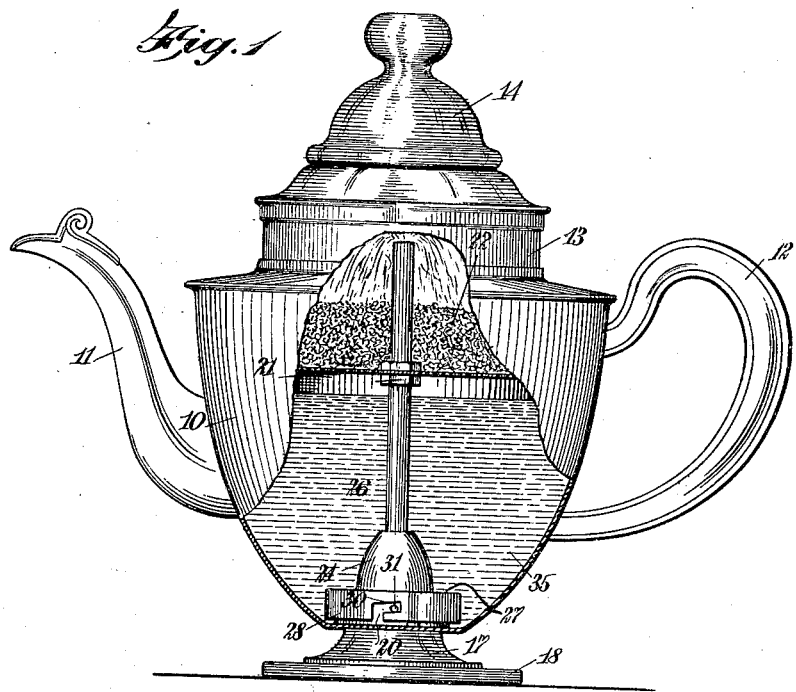
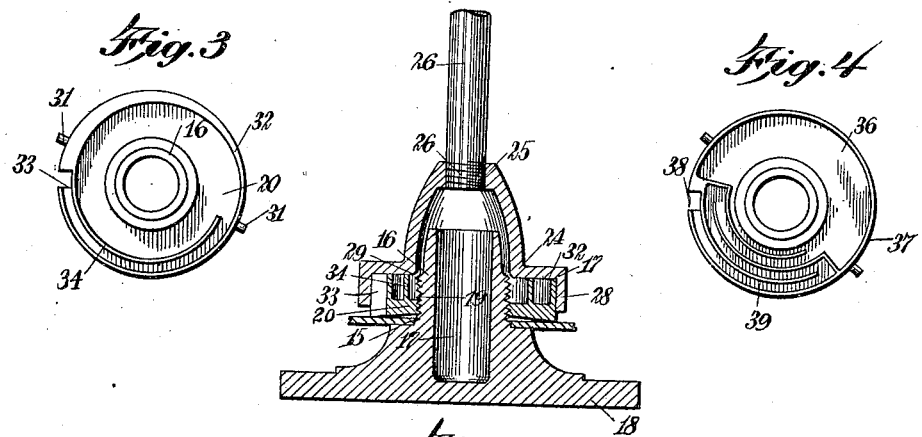
WITNESSES
INVENTOR
John J. O'Mara
BY
ATTORNEYS

UNITED STATES PATENT OFFICE.

JOHN J. O'MARA, OF NEW YORK, N. Y.

PERCOLATOR.

997,845.

Specification of Letters Patent. Patented July 11, 1911.

Application filed February 1, 1911. Serial No. 605,874.

*To all whom it may concern:*

Be it known that I, JOHN J. O'MARA, a citizen of the United States, and a resident of the city of New York, borough of Brooklyn, in the county of Kings and State of New York, have invented a new and Improved Percolator, of which the following is a full, clear, and exact description.

This invention relates to percolators by means of which infusions can be made from coffee and other substances, and has reference more particularly to a percolator which comprises a main vessel or pot, a heating chamber having an opening within the vessel, a percolating tube, a container for the coffee or other material from which the infusion is to be made, and arranged to have the percolating tube discharge over the material therein, and a connection for removably associating the tube and the heating chamber, this connection forming a tortuous passage connecting the tube and the chamber with the main vessel.

The object of the invention is to provide an inexpensive and efficient percolator, by means of which an infusion of any desired strength can be made from coffee or any other material adapted for the purpose, which comprises few parts, which can be easily taken apart and re-assembled in cleaning or repairing, which obviates the use of a valve or other movable member controlling the entrance of the liquid into the heating chamber, and in which the liquid escaping from the heating chamber will pass through a percolating tube, to the container, and will not force its way back into the main pot or vessel.

The invention consists in the construction and combination of parts to be more fully described hereinafter and particularly set forth in the claims.

Reference is to be had to the accompanying drawings forming part of this specification, in which similar characters of reference indicate corresponding parts in all the views, and in which—

Figure 1 is a side elevation of an embodiment of my invention, a portion of the main vessel being broken away to disclose the parts of the device located therein; Fig. 2 is an enlarged, vertical section of the heating chamber, the lower portion of the percolating tube, and the connection between these elements; Fig. 3 is a plan view of part of the connection between the heating chamber and the percolating tube; Fig. 4 is a similar view showing a connection of modified form; and Fig. 5 is a similar view showing a connection of further modified form.

Before proceeding to a more detailed explanation of my invention, it should be clearly understood, that while the same is particularly useful in connection with coffee percolators, it can also be advantageously employed with other devices for producing infusions for use as beverages or for other purposes.

Percolators are now generally provided with auxiliary heating chambers into which a small quantity of the fluid enters, so that it is heated more rapidly than the main body of the fluid. This small quantity of the fluid, when heated, will force its way up through the percolating tube, and fall upon the infusion material, in the form of a spray. Thereupon, a further quantity of liquid enters the heating chamber, to be in turn heated and sprayed upon the material in the container. Certain forms of percolators employ movable valve members, to prevent the heated liquid in the chamber from escaping back into the main vessel, and to cause it to pass out through the percolating tube. In other forms of percolators, the entrance into the heating chamber is of tortuous nature, or is provided with baffles or the like, so that the heated fluid in the chamber cannot easily return into the main vessel, but will escape through the percolating tube.

In my improved percolator I provide a connection for removably associating the percolating tube and the heating chamber, as will appear more clearly hereinafter, whereby a tortuous passage is formed, which is particularly advantageous for the purpose. The connection also allows the percolating tube and the chamber to be readily separated, so that the percolating tube and the parts permanently associated therewith can be easily removed from the device.

Certain of the details of construction, shown for example, herewith, form no part of the invention, and can be varied in accordance with individual preference and special conditions, without deviating from the essence of the invention as defined in the appended claims.

Referring more particularly to the drawings, I have shown for example, a coffee pot comprising a main pot or vessel 10, of any suitable form, having a spout 11, and a handle 12. The main vessel has a reduced top 13, upon which a suitable lid or cover 14, is fitted. At the bottom of the vessel is an opening 15, which receives a reduced neck 16 of a heating chamber 17. This chamber has a laterally extended base 18, which forms a suitable support for the percolator, so that the same can be stood upon a stove or other heating device.

The device can be fashioned from any suitable material. Preferably, the main vessel is spun from sheet metal, and the heating chamber is formed from cast metal.

The neck 16 of the heating chamber has adjacent to the base of the latter, a threaded part 19. A collar 20 having a central, threaded opening, is tightly screwed by means of the latter, upon the neck, and engages the bottom of the main vessel, serving to attach securely the heating chamber to the main vessel. Preferably, the bottom of the collar is inwardly beveled, as is clearly shown in Fig. 2. I employ a percolating tube 26 of any suitable form, having attached thereto, near the upper end, a container 21, for the coffee 22. The container may be attached to the percolating tube in any suitable manner, for example, by means of lock-nuts 23. A cap 24 of curved and conical form has a blunt upper end provided with a threaded opening 25, by means of which it is mounted upon the corresponding, threaded, lower end of the percolating tube 26. At the rim, the cap has a laterally extended part 27 having a peripheral flange 28 adapted to embrace the collar, and serving to mount the cap removably upon the same, so that the parts engage frictionally. When the parts are so positioned, the inner edge or rim 29 of the cap is separated but a slight distance from the upper end of the threaded part 19 of the neck, so that a small, annular passage is formed between them. The flange 28, at opposite points, has bayonet slots 30 adapted to coöperate with studs or projections 31 of the collar, to permit the parts to be removably associated, and held against accidental displacement.

The collar 20 has a peripheral rim 32 cut away at one point to form an inlet 33. Within the rim 32 is a wall or partition 34, extending from the inlet 33 part-way around the collar, and substantially parallel to the rim. In this way, an inlet passage of curved or spiral shape is formed. When the cap fits upon the collar, the under face of the former rests upon the upper edges of the rim 32 and the partition or wall 34, to complete the passage. It will be understood that when part of the water 35 or other fluid in the main vessel enters the heating chamber it must pass through the inlet 33, the passage formed by the rim 32 and the partition 34, and through the narrow, annular passage formed between the cap and the neck. The entire passage is a tortuous one, and when the liquid in the heating chamber has reached a point of ebullition, so that it will tend to escape from the chamber, it is naturally easier for it to pass out through the percolating tube 26 than to return through the tortuous passage, against the pressure of the body of the fluid 35.

In the modified form of the device shown in Fig. 4 I employ a collar 36 having a rim 37 and an inlet 38, similar to the corresponding elements above described. Within the collar is a plurality of concentric partitions 39, successively offset, and arranged to form passage sections opening in opposite directions. In this way the effective length of the tortuous passage is materially increased.

In Fig. 5 I have shown a modified form of the device, similar to that illustrated in Fig. 3, the collar 20$^a$ having a rim 32$^a$ and an entrance 33$^a$. The partition 34$^a$ is extended all the way around the collar, however, and is in the form of a true spiral. The purpose of this construction is also to increase the effective length of the tortuous passage.

Having thus described my invention, I claim as new, and desire to secure by Letters Patent:

1. A percolator, comprising a main vessel, a heating chamber associated therewith and having an outlet part extending into said vessel, a percolating tube, a container for coffee, associated with said tube, said chamber having within said vessel a member provided with spaced walls and having an inlet opening into the spaces between said walls, a cap carried by said tube and adapted to seat upon said member and engaging said walls, and means whereby said cap and said member can be removably connected, the space between said walls constituting a passage through which fluid can pass from said vessel into said heating chamber.

2. A percolator, comprising a main vessel having an opening in the bottom thereof, a heating chamber having a neck extending through said opening into said vessel, a collar secured about said neck and serving to hold said heating chamber and said main vessel together, a percolating tube, a container for coffee, associated with said tube, and a cap carried by said tube and having means whereby it can be removably attached to said collar, said neck projecting partly into said cap, said collar having spaced walls and an opening into the space between said walls, forming a passage effecting communication between said vessel and said heating chamber, said cap seating upon said walls when attached to said collar.

3. A percolator, comprising a main vessel having an opening in the bottom thereof, a heating chamber having a neck extending through said opening, into said vessel, a collar secured about said neck and serving to hold said heating chamber and said main vessel together, a percolating tube, a container for coffee, associated with said tube, and a cap carried by said tube and having means whereby it can be removably attached to said collar, to permit said neck to project partly into said cap, said collar having an upwardly extending rim, and a partition within said rim, said collar having an opening forming an entrance to the space between said rim and said partition, said cap seating upon said collar and engaging said rim and said partition.

In testimony whereof I have signed my name to this specification in the presence of two subscribing witnesses.

JOHN J. O'MARA.

Witnesses:
ELSIE M. KRON,
JOSEPH B. KAVANAGH.

---

Copies of this patent may be obtained for five cents each, by addressing the "Commissioner of Patents, Washington, D. C."